United States Patent
Ku (10) Patent No.: US 8,217,855 B2
(45) Date of Patent: Jul. 10, 2012

(54) SYSTEM FOR GENERATING A PLURALITY OF DISPLAY SIGNALS

(75) Inventor: Yeegee Ku, Inverness, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 540 days.

(21) Appl. No.: 12/570,076

(22) Filed: Sep. 30, 2009

(65) Prior Publication Data

US 2010/0083343 A1 Apr. 1, 2010

Related U.S. Application Data

(60) Provisional application No. 61/101,386, filed on Sep. 30, 2008.

(51) Int. Cl.
*G09G 5/00* (2006.01)
(52) U.S. Cl. .............................. 345/1.1; 345/1.3; 345/59
(58) Field of Classification Search .................... None
See application file for complete search history.

(56) References Cited

U.S. PATENT DOCUMENTS

| 5,515,511 | A | 5/1996 | Nguyen et al. |
| 7,136,042 | B2 | 11/2006 | Magendanz et al. |
| 2004/0080482 | A1 | 4/2004 | Magendanz et al. |
| 2007/0120763 | A1* | 5/2007 | De Paepe et al. ............. 345/1.3 |
| 2008/0074403 | A1* | 3/2008 | Cho et al. ..................... 345/204 |
| 2009/0040135 | A1* | 2/2009 | Piazza et al. .................. 345/2.1 |

* cited by examiner

*Primary Examiner* — Muhammad N Edun
(74) *Attorney, Agent, or Firm* — Alexander J Burke (57) ABSTRACT

A system generates a plurality of display signals. The system includes a source of data representing a plurality of display images. A processor combines the data representing the plurality of display images into a single composite data matrix in which the data representing the plurality of display images are interleaved. A DVI signal generator produces a DVI signal representing the single composite data matrix. A splitter is responsive to the DVI signal representing the single composite data matrix. The splitter extracts the respective data representing the plurality of display images and generates corresponding DVI signals respectively representing the plurality of display images.

18 Claims, 5 Drawing Sheets

SYSTEM FOR GENERATING A PLURALITY OF DISPLAY SIGNALS

The present invention relates to a system for producing a plurality of display signals, and in particular to a system for producing a plurality of display signals using the digital visual interface (DVI) format.

BACKGROUND OF THE INVENTION

Figure 1:
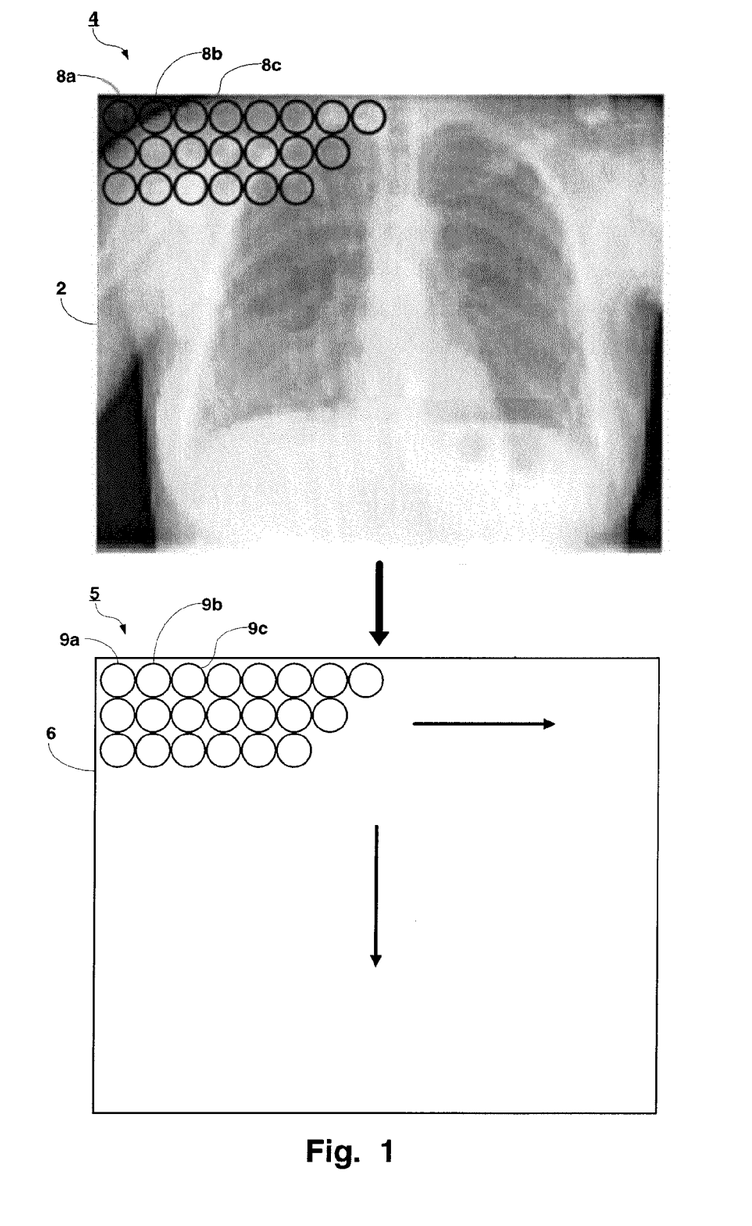
FIG. 1 is a diagram illustrating the correspondence between pixels defining an image and a data matrix containing data representing the image.

It is known to represent an image by a plurality of pixels arranged as an array of rows and columns of pixels. Typically the pixels are considered to be in a sequential order form left to right and top to bottom. A pixel represents the image value of a tiny portion of the image 2 (FIG. 1). A pixel is represented by a digital data field representing the image value (for example, the color and brightness) of the pixel. FIG. 1 is a diagram illustrating the correspondence between pixels 4 representing an image 2 and a data matrix 6 containing data fields 5 representing the pixels 4 in the image 2. In FIG. 1, an image 2 is represented by rows and columns of respective pixels 4. In FIG. 1, a pixel is represented by a composite 24 bit digital data field, containing an 8 bit data component representing the red content of the pixel, an 8 bit data component representing the blue content of the pixel, and an 8 bit data component representing the green content of the pixels. The digital data fields 5, representing the pixels 4 in the image 2, are stored in a data matrix 6 in a memory. The 24 bit data field representing the top left pixel 8a is stored at location 9a in the data matrix 6; the 24 bit data field representing the pixel 8b is stored at location 9b in the data matrix 6; the 24 bit data field representing the pixel 8c is stored at location 9c in the data matrix 6, and so forth. While the data matrix 6 is displayed in FIG. 1 as rectangular, and with locations of the pixels 4 representative data fields 5 corresponding to the location of the pixels 4 in the image 2, one skilled in the art understands that FIG. 1 is schematic only and any arrangement of the pixels 4 representative data fields 5 in a data matrix 6 may be used, provided a correspondence between data field 5 and pixels 4 is maintained.

The Digital Visual Interface (DVI) standard is a video interlace standard designed to provide relatively high visual quality images on digital display devices. The DVI interface uses a digital protocol in which the desired color of respective pixels is transmitted as binary data. When a display device is driven at its native resolution, it will read each pixel color representative binary number and apply that color to the appropriate pixel on the display. In this way, each pixel in the output buffer of the source device corresponds directly to one pixel in the display device.

The data format used by DVI is a serial format. A single DVI link consists of four twisted pairs of wires transmitting respective serial signals representing red, green, blue color components of sequential pixels, and corresponding clock signals. As described above with respect to FIG. 1, 24 bits per pixel are transmitted: one color component representative data field of 8 bits serially through the corresponding twisted pair. The picture is transmitted pixel by pixel from left to right in each line; and line by line, with blanking intervals between each line, from top to bottom for each frame. That is, in FIG. 1, the 24 bit data field representing the pixel 9a, is transmitted; followed by the 24 bit data field representing the pixel 9b; followed by the 24 bit data field representing the pixel 9c, and so forth, as represented by the arrow pointing to the right. When the pixels in the top row have been transmitted, followed by data representing blanking and synchronization, the pixel representative data in the second row are transmitted in the same order, followed by the pixel representative data in the third row, and so forth, as represented by the arrow pointing downward. This data stream is received by a display device which reproduces the image represented by the respective pixel representative data.

With a single DVI link, the largest resolution possible at 60 Hz is 2.75 megapixels (including blanking intervals). For practical purposes, this allows a maximum screen resolution at 60 Hz of 1915×1436 pixels (standard 4:3 ratio), 1854×1483 pixels (5:4 ratio) or 2098×1311 (widescreen 8:5 ratio). The DVI format also has provision for a second link, containing another set of red, green, and blue twisted pairs which operate in conjunction with the twisted pair. When more resolution and/or bandwidth is required than is possible with a single link, the second link is enabled, and alternate pixels are transmitted concurrently on the respective sets of red, green and blue twisted pairs in the first and second links, allowing resolutions up to 4 megapixels at 60 Hz. The DVI specification mandates a fixed single link maximum pixel clock frequency of 165 MHz, where display modes that require less than this use the single link mode, and those that require more switch to the dual link mode. The data link pairs carry binary data at ten times the pixel clock reference frequency, for a maximum data rate of 1.65 Gbit/s×3 data pairs for a single DVI link.

In typical video boards incorporating a DVI format, two separate display devices may be connected to a single video board. In cases where more than two display devices are desired, an additional video board is added to the system. This permits two more display devices to be connected. However, an additional video board adds expense to the computer system, and may take up high speed connectors on the computer system mother board. Such connectors are typically scarce. Because of the expense and use of scarce resources caused by the use of two DVI video boards, it is desirable to be able to display two or more less-than-full resolution images on a single DVI signal.

SUMMARY OF THE INVENTION

The inventor realized that it is not always required that full resolution images be displayed by the system, and that a single DVI format signal operating at a relatively high (e.g. full) resolution may communicate pixel representative data representing a plurality of relatively low (e.g. less-than-full) resolution images. In such a system, only a single DVI video board is required to generate a plurality of display signals. Such a system reduces costs and minimizes use of high speed sockets on computer system motherboards which can be a scarce commodity.

In accordance with principles of the present invention, a system generates a plurality of display signals. The system includes a source of data representing a plurality of display images. A processor combines the data representing the plurality of display images into a single composite data matrix in which the data representing the plurality of display images is interleaved. A DVI signal generator produces a DVI signal representing the single composite data matrix. A splitter is responsive to the DVI signal representing the single composite data matrix. The splitter extracts the respective data representing the plurality of display images and generates corresponding DVI signals respectively representing the plurality of display images.

DESCRIPTION OF THE INVENTION

A processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a controller or microprocessor, for example, and is conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

An executable application, as used herein, comprises code or machine readable instructions for conditioning the processor to implement predetermined functions, such as those of an operating system, a system for generating a plurality of display signals or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

An image, or display image, as used herein, comprises a single, still, image, or a sequence of images which when displayed sequentially, may display movement, i.e. a video image. As used herein, a relatively low resolution signal is a signal which has a resolution lower than a maximum resolution image capable of being carried by a DVI signal.

Figure 2:
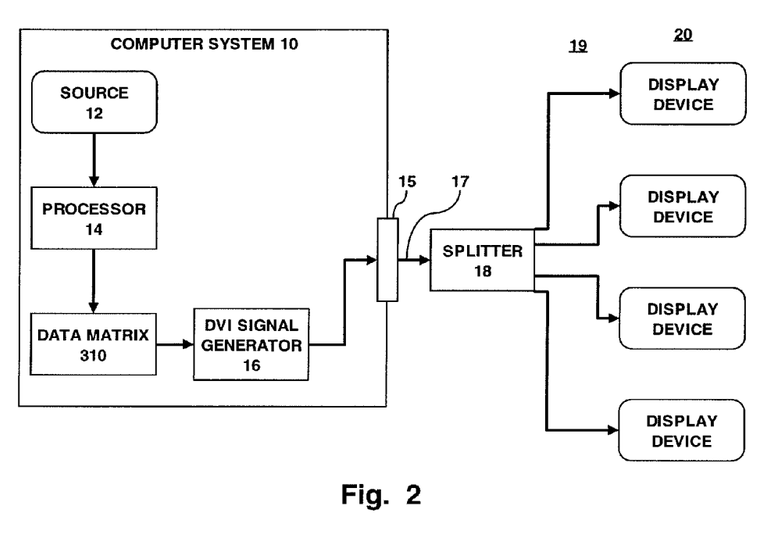
FIG. 2 is a block diagram of a system for generating a plurality of display images in accordance with principles of the present invention.

FIG. 2 is a block diagram of a system for generating a plurality of display signals. The system may include a computer system 10. The computer system 10 may be comprised in a known personal computer system (PC). One skilled in the art understands that the computer system 10 of FIG. 2 contains other subsystems and circuitry, including user input and output devices. Such subsystems and circuitry are not germane to, or necessary for the understanding of, the present invention. They are omitted from FIG. 2 to simplify the figure.

In FIG. 2, a source 12 provides data representing a plurality of images. For example, the source 12 may be an executable application or procedure which processes input signals, and generates images representing parameters of those input signals. More specifically, the source 12 may be implemented in a medical patient monitoring system. Electrodes may be attached to a patient and signals derived from those electrodes processed to generate waveform images representing, for example, an electrocardiogram of the patient. Alternatively, sensors in medical monitoring or treatment systems may generate signals representing patient physiological data or patient treatment data. For example, a respirator may include sensors to determine the volume of air inspired by the patient, and/or the proportion of oxygen in the air provided to the patient. The source 12 may also be an executable application which receives signals from an external source of image representative signals, such as a camera or other image generator. Or the source 12 may be an executable application which reads files containing image representative data. In any event, the source 12 produces data representing a plurality of display images.

The plurality of images represented by the image representative data may be relatively low resolution images, i.e. less-than-full DVI resolution images. For example, as described above, a maximum resolution provided by a single link DVI format signal is up to 1915×1436 pixels, i.e. 2.75 Megapixels; or 4 Megapixels for a dual link. However, images provided by the source 12 may, for example, have sufficient resolution at 512×512 (262 kilopixels). Data representing four such images may easily be carried by a single DVI signal. A processor 14 combines the data representing the plurality of display images, into a single composite data matrix 310 (FIG. 3), which may be considered to represent a composite of the plurality of images. The data representing the plurality of display images are interleaved in the data matrix 310 in a manner described in more detail below.

Figure 3:
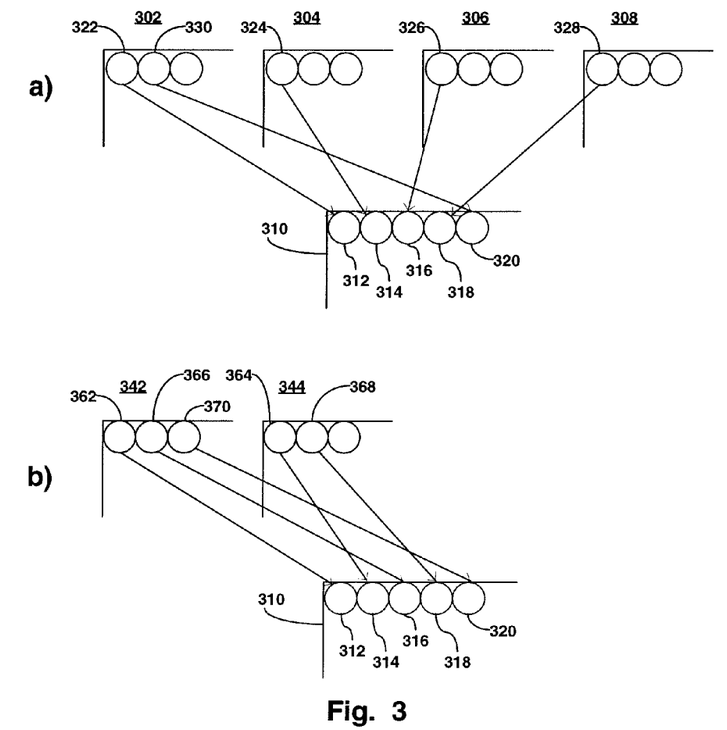
FIG. 3 is a memory allocation diagram illustrating the assignment of data representing pixels in a respective plurality of display images to locations in a composite data matrix containing data fields representing the pixels in accordance with principles of the present invention.

FIG. 3 illustrates the assignment of pixels in the plurality of display images to locations in the composite data matrix 310 containing data fields representing the pixels. In FIG. 3a, four images, 302, 304, 306, 308 are illustrated in a manner similar to FIG. 1. The data matrix 310 is also illustrated in FIG. 3a. As illustrated in FIG. 3a, the pixel representative data is interleaved in the following manner: data representing the first pixel 322 in image 302 is stored at location 312 in the data matrix 310; data representing the first pixel 324 in image 304 is stored at location 314 in the data matrix 310; data representing the first pixel 326 in image 306 is stored at location 316 in the data matrix 310; data representing the first pixel 328 in image 308 is stored at location 318 in the data matrix 310; data representing the second pixel 330 in image 302 is stored at location 320 in the data matrix 310, and so forth.

FIG. 3b also illustrates the assignment of pixels in a respective plurality of images to locations in the composite data matrix 310 containing data fields representing the pixels. In FIG. 3b, two images, 342 and 344 are illustrated in a manner similar to FIG. 1 and FIG. 3a. As illustrated in FIG. 3b, the pixel representative data is interleaved in the following manner: data representing the first pixel 362 in image 342 is stored at location 312 in the data matrix 310; data representing the first pixel 364 in image 344 is stored at location 314 in the data matrix 310; data representing the second pixel 366 in image 342 is stored at location 316 in the data matrix 310; data representing the second pixel 368 in image 344 is stored at location 318 in the data matrix 310; data representing the third pixel 370 in image 342 is stored at location 320 in the data matrix 310, and so forth. As described above, for images 302-308 and 342-344 which are relatively low resolution, there is sufficient room (4 Megapixels) in the data matrix 310 to hold the respective pixel representative data for the plurality of images.

In general, as illustrated in FIG. 3, pixel representative data stored in the data matrix 310 is arranged as sequential sets of pixel representative data. A set of pixel representative data includes data representing next sequential pixels from the respective plurality of display images. In FIG. 3a, a first set of pixel representative data includes data fields 312, 314, 316 and 318, holding data representing first pixels in the respective images 302, 304, 306, 308. A next sequential set of pixel representative data includes data field 320, and data fields for the next sequential pixels in the images 302, 304, 306 and 308, i.e. the second pixels. In FIG. 3b, a first set of pixel representative data includes data fields 312 and 314, holding data representing first pixels in the respective images 342 and 344. A next sequential set of pixel representative data includes data fields 316 and 318, representing the next sequential pixels in the respective images 342 and 344.

Referring again to FIG. 2, the data matrix 310 is treated as containing data representing a composite image. Data in the data matrix 310 is supplied to a DVI signal generator 16. In the computer system 10 illustrated in FIG. 2, implemented in a PC, the DVI signal generator may be a DVI video card installed in a computer system 10 motherboard connector. The DVI signal generator 16 produces a DVI signal representing the data in the data matrix 310 as if it were a single image. This signal is provided to a DVI cable connection 15 on the computer system 10.

A splitter 18 is coupled via a DVI cable 17 to the DVI cable connection 15 on the computer system 10. The splitter 18 is responsive to the DVI signal representing the single composite image representative data from the data matrix 310. The splitter 18 extracts the respective data 312-320 (FIG. 3) representing the pixels in the respective plurality of display images 302-308; 342-344, and supplies the appropriate pixel representative data to a corresponding display device. That is, the splitter 18 operates to provide data fields 322, 330 etc to a first display device 20 to produce image 302; provide data fields 324 etc. to a second display device 20 to produce image 304; provide data fields 326 etc. to a third display device 20 to produce image 306, and provide data fields 328 etc. to a fourth display device 20 to produce image 308. The splitter 18 generates corresponding DVI signals respectively representing the plurality of display images 302-308; 342-344. These DVI signals are coupled to the respective display devices 20 via corresponding DVI cables 19. The display devices 20 display the respective images 302-308; 342-344.

Because the pixel representative data are transmitted serially through the DVI cable 17 to the splitter 18, as described above, the splitter 18 could be described as, and may be fabricated as, a demultiplexer. One skilled in the art understands how to design and fabricate such a splitter/demultiplexer 18 to extract the pixel representative data from the DVI signal representing the respective plurality of images, based on the description of the generation of the DVI signal illustrated in FIG. 3, and described above. The functions of the splitter/demultiplexer 18 may be implemented by hardware, by an executable application or procedure executing on a processor, by firmware controlling processing circuitry, or by a combination of any of these techniques. One skilled in the art understands the processing required, the tradeoffs among these techniques, and how to design and implement a splitter/demultiplexer 18.

Figure 4:
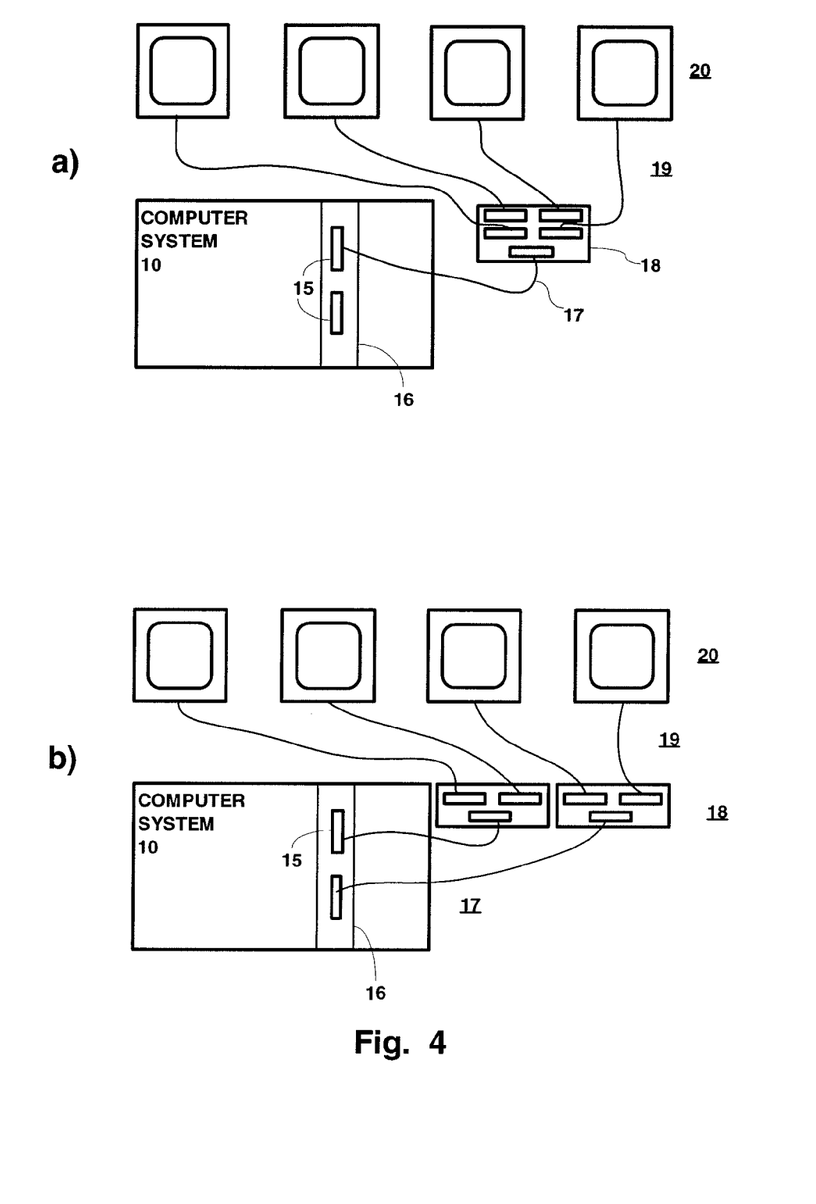
FIG. 4 is a block diagram illustrating the interconnection of a computer system to a plurality of display devices in accordance with principles of the present invention.
Figure 5:
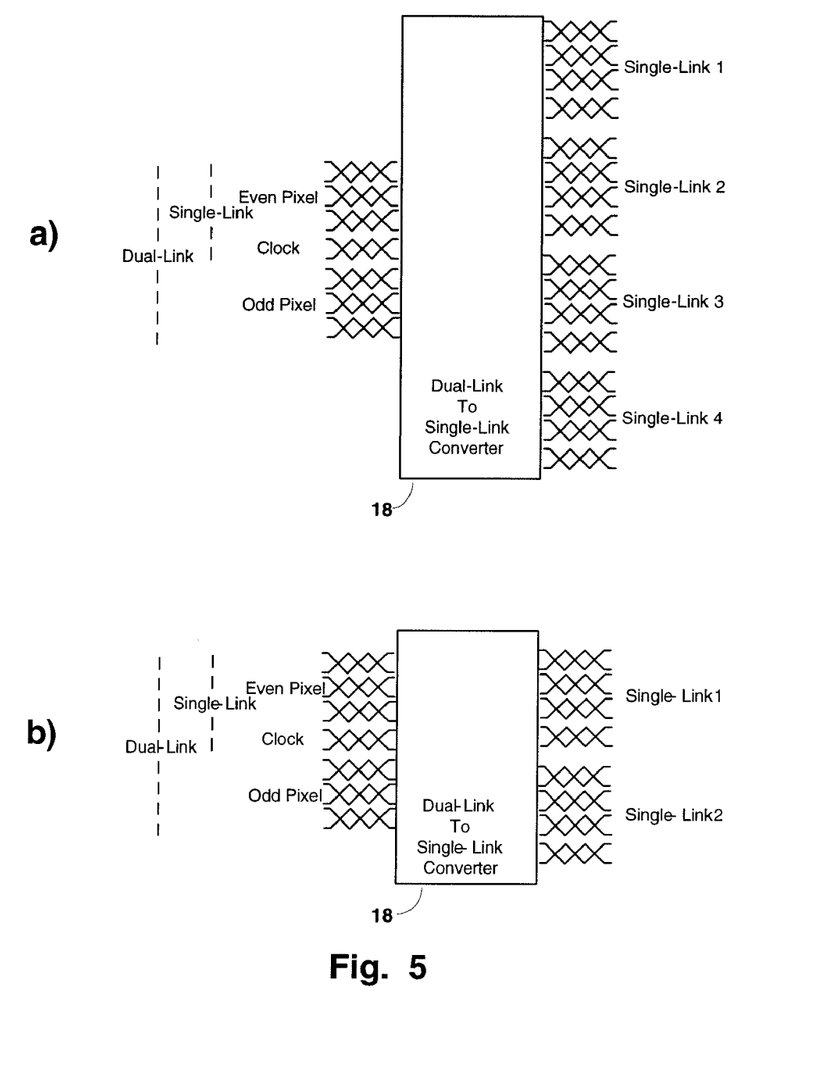
FIG. 5 is a more detailed block diagram of input and output terminals of splitters in accordance with principles of the present invention.

FIG. 4 is a block diagram illustrating the interconnection of the computer system 10 to a plurality of display devices 20, and FIG. 5 is a more detailed block diagram illustrating input and output terminals of splitters 18, in accordance with principles of the present invention. In FIG. 4 and FIG. 5, those elements which are the same as those illustrated in FIG. 1 are designated by the same reference number and will not be described in detail below. In FIG. 4a, a computer system 10, implemented in a PC, includes a DVI signal generator 16 implemented as a DVI video card. As described above, a DVI video card typically includes two DVI connectors 15. In FIG. 4a, a first one of the DVI connectors 15 is connected to an input DVI connector of a one-to-four splitter 18 via a DVI cable 17. Four output DVI connectors from the splitter 18 are connected to corresponding input DVI connectors of respective display devices 20 via DVI cables 19. The display devices 20 display the respective images 302-308.

FIG. 5a illustrates that the input terminal of the splitter 18 of FIG. 4a receives three R, G, and B twisted pairs and a clock twisted pair for single link operation, and three additional R, G and B twisted pairs for double link operation, as described in more detail above. FIG. 5a further illustrates that four respective output terminals of the splitter 18 of FIG. 4a produce four sets of three R, G, and B twisted pairs and a clock twisted pair forming a single link DVI signal carrying respective image representative data. These four twisted pair sets are connected to the four DVI output connectors of the splitter 18.

In operation, pixel representative data from the data matrix 310 (FIG. 1), interleaved as illustrated in FIG. 3a and described in detail above, is transmitted through DVI cable 17 to splitter 18. Splitter 18 demultiplexes the interleaved pixel representative data and generates four respective DVI signals representing the four images 302-308. These respective DVI signals are transmitted over the output terminal twisted pairs via DVI cables 19 to the display devices 20.

In FIG. 4b, a computer system 10, implemented in a PC, includes a DVI signal generator 16 implemented as a DVI video card. In FIG. 4b, a first one of the DVI connectors 15 is connected to an input DVI connector of a first one-to-two splitter 18 and a second one of the DVI connectors 15 is connected to an input DVI connection of a second one-to-two splitter 18 via respective DVI cables 17. Two output DVI connectors from the first splitter 18 are connected to corresponding input DVI connectors of two respective display devices 20 via DVI cables 19, and two output DVI connectors from the second splitter 18 are connected to corresponding input DVI connectors of two additional respective display devices 20 via DVI cables 19. The display devices 20 display the respective images.

FIG. 5b illustrates that the input terminal of the splitter 18 of FIG. 4b receives three R, G, and B twisted pairs (labeled "Even Pixel"), a clock twisted pair, and three additional R, G and B twisted pairs (labeled "Odd Pixel") i.e. for double link operation, as described in more detail above. FIG. 5b further illustrates that two respective output terminals of the splitter 18 of FIG. 4b produce two sets of three R, G, and B twisted pairs and a clock twisted pair forming a single link DVI signal carrying respective image representative data. These two twisted pair sets are connected to the two DVI output connectors of the splitter 18.

In FIG. 4b, pixel representative data from the data matrix 310, interleaved as described in detail above with respect to FIG. 3b, is transmitted through DVI cable 17 to one of the splitters 18. That splitter 18 demultiplexes the pixel representative data and generates two respective DVI signals representing two images 342-344. The respective DVI signals are transmitted over the output terminal twisted pairs via DVI cables 19 to two of the display devices 20. Those display devices 20 display the respective images 342-344. The second splitter 18 operates in the same manner to demultiplex the interleaved pixel representative data representing two images and generates respective DVI signals representing those two images.

One skilled in the art understands that the one-to-four splitter 18 illustrated in FIG. 4*a* and FIG. 5*a*; and the one-to-two splitter 18 illustrated in FIG. 4*b* and FIG. 5*b* may be designed and fabricated to specifically perform their respective functions. That is, in order to include four relatively low resolution images in a single DVI signal, an executable application to interleave the pixel representative data as illustrated in FIG. 3*a* is executed on the computer system 10 and a one-to-four splitter 18 designed and fabricated to demultiplex four image representative signals, as described above, is used in conjunction with that executable application. To include two relatively low resolution images in a single DVI signal, an executable application to interleave the pixel representative data as illustrated in FIG. 3*b* is executed on the computer system 10 and a one-to-two splitter 18 designed and fabricated to demultiplex two image representative signals, as described above, is used in conjunction with that executable application.

One skilled in the art further understands that it is possible to design and fabricate a splitter which may be controlled to demultiplex pixel representative data interleaved in different manners. In this case, the processor 14 (FIG. 1) selectively combines the image representative data interleaved in one of two or more manners. The splitter 18 is controlled to extract the respective image representative data in an appropriate manner, in response to a control signal. The processor 14 provides a control signal to the splitter 18 to indicate which type of interleaving is currently being used, and thus indicate to the splitter 18 which type of demultiplexing is required. This control signal may be a separate signal provided to the splitter 18 via a separate signal conductor. It is also possible to provide a control signal via the DVI signal. For example, a 24 bit control signal may be encoded into a data field (e.g. the first data field) in the data matrix 310, instead of providing pixel representative data in the data field. This 24 bit control signal may be used to control the operation of the splitter 18. More than one data field may be used to carry a control signal to a splitter 18. One skilled in the art understands how to arrange the demultiplexing so that this control data field is extracted, and used to control the operation of the remainder of the splitter 18.

One skilled in the art also realizes that the splitter 18 may be designed and fabricated to operate in conjunction with a processor executing an executable application. Data representing the executable application may be transmitted to the splitter 18 via data fields in the DVI signal. Referring to FIG. 2, in such a case, the processor 14 inserts data representing the executable application into the data matrix 310. This data is provided to the splitter 18, which extracts this data and creates the executable application within the splitter 18. When transmission of the executable application to the splitter 18 is complete, the splitter 18 begins to operate under control of that executable application to demultiplex image representative data from the computer system 10. One skilled in the art understands how to design and implement such a system, and further understands that other methods for controlling the operation of the splitter 18 are available.

One skilled in the art also understands that other arrangements of combining pixel data representing a plurality of display images in the data matrix are possible. For example the data matrix may also be partitioned into a respective plurality of image regions. More specifically, the composite image may be split horizontally and/or vertically to produce respective regions. These regions may be equal sized or of different sizes. Data fields representing pixels in the plurality of images may be stored in a corresponding one of the plurality of image regions in the data matrix 310 by the processor 14. The splitter 18 operates to extract pixel representative data from the different image regions and supply that data to the display device 20 displaying the corresponding image. The first technique does not require a buffer storage device, but the individual images are unrecognizable in the composite image. The second technique allows the individual images to be recognizable in the composite image, but requires buffer storage to generate the DVI signal representing the single composite data matrix and extract the image representative data from the DVI signal.

While systems for carrying two and four images in a DVI signal, one skilled in the art understands that the plurality of display images may include any number provided the total number of pixels in the plurality of display images is less than the maximum number of pixel representative data fields available in a DVI signal (e.g. 4 Megapixels for a dual link DVI generator. One skilled in the art also recognizes that typical DVI signal generators for use in personal computers are capable of producing two DVI signals, and that either or both of these signals may be used to carry data representing a plurality of display images in the manner described above.

The invention claimed is:

1. A system for generating a plurality of display signals, comprising:
   a source of data representing a plurality of display images;
   a processor for combining the data representing the plurality of display images into a single composite data matrix in which data representing the plurality of display images are interleaved;
   a DVI signal generator producing a DVI signal representing the single composite data matrix; and
   a splitter, responsive to the DVI signal representing the single composite data matrix, for extracting the respective data representing the plurality of display images and generating corresponding DVI signals respectively representing the plurality of display images.

2. The system of claim 1 wherein:
   the source provides the pixel representative data representing respective ones of the plurality of display images arranged in sequential order;
   the processor combines the data representing the plurality of display images interleaved by providing sequential sets of pixel representative data, a set of pixel representative data including data representing a next sequential pixel from the respective plurality of display images.

3. The system of claim 1 wherein the single composite data matrix is partitioned into a respective plurality of image regions and pixel representative data representing the plurality of display images is stored in a corresponding one of the plurality of image regions.

4. The system of claim 1 wherein:
   the processor selectively combines the image representative data interleaved in one of two or more different manners and provides a control signal to the splitter to indicate which type of interleaving is being used; and
   the splitter is controlled to extract the respective image representative data in an appropriate manner in response to the control signal.

5. The system of claim 4 wherein the control signal is a separate signal provided to the splitter via a separate signal conductor.

6. The system of claim 4 wherein a data field in the single composite data matrix provided to the splitter via the DVI signal carries the control signal.

7. The system of claim 4 wherein:
the splitter operates in conjunction with a processor executing an executable application; and
data representing the executable application is transmitted to the splitter via data fields in the DVI signal.

8. A system for generating a plurality of display signals, comprising:
a computer system, comprising:
a source of data representing a plurality of display images;
a processor for combining the data representing the plurality of display images into a single composite data matrix in which data representing the plurality of display images are interleaved;
a DVI signal generator producing a DVI signal representing the single composite data matrix; and
a splitter, responsive to the DVI signal representing the single composite data matrix, for extracting the respective data representing the plurality of display images and generating corresponding DVI signals respectively representing the plurality of display images.

9. The system of claim 8 wherein the DVI signal generator is a DVI video board.

10. The system of claim 9 wherein the DVI video board is capable of concurrently providing two DVI signals.

11. A method for generating a plurality of display signals, comprising:
generating data representing a plurality of display images;
combining the data representing the plurality of display images into a single composite data matrix in which data representing the plurality of display images are interleaved;
generating a DVI signal representing the single composite data matrix;
extracting from the DVI signal representing the single composite data matrix the respective data representing the plurality of display images; and
generating corresponding DVI signals respectively representing the plurality of display images.

12. The method of claim 11 wherein the steps of generating a source of data representing a plurality of display images, combining the data representing the plurality of display images into a single composite data matrix in which data representing the plurality of display images are interleaved, and generating a DVI signal representing the single composite data matrix are performed in a computer system.

13. The method of claim 11, wherein:
the step of generating the image representative data comprises the step of providing pixel representative data representing respective ones of the plurality of display images arranged in sequential order; and
the step of combining the image representative data comprises interleaving the image representative data by providing sequential sets of pixel representative data, a set of pixel representative data including data representing a next sequential pixel from the respective plurality of display images.

14. The method of claim 11, wherein the step of combining the image representative data comprises partitioning the single composite data matrix into a respective plurality of image regions and image representative data representing the plurality of display images is stored in a corresponding one of the plurality of image regions.

15. The method of claim 11, wherein:
the step of combining the image representative data comprises selectively combining the image representative data interleaved in one of two or more different manners and providing a control signal to indicate which type of interleaving is being used; and
the step of extracting respective image representative data comprises extracting the respective image representative data in an appropriate manner in response to the control signal.

16. The method of claim 15 wherein the control signal is a separate signal provided via a separate signal conductor.

17. The method of claim 15 wherein a data field in the DVI signal representing the single composite data matrix carries the control signal.

18. The method of claim 15 wherein:
the step of extracting respective image representative data comprises executing an executable application; and
the method further comprises the step of transmitting data representing the executable application via data fields in the DVI signal.

* * * * *